Jan. 12, 1971 P. H. ENGEL 3,554,766
PROCESS FOR MAKING CANDY CONTAINING FREEZE-DRIED FRUIT PARTICLES
Filed June 7, 1967
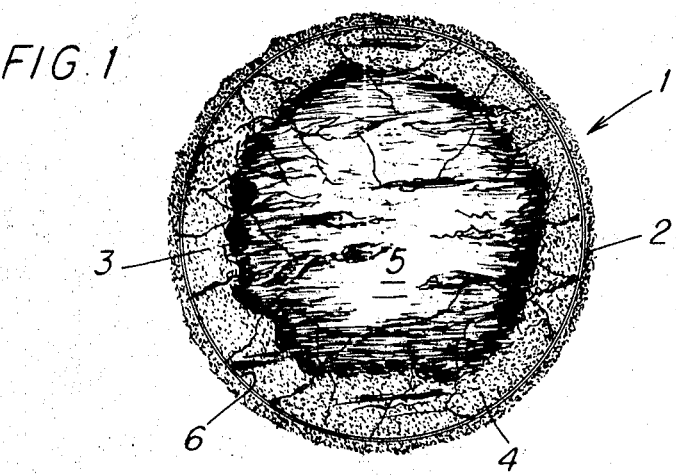
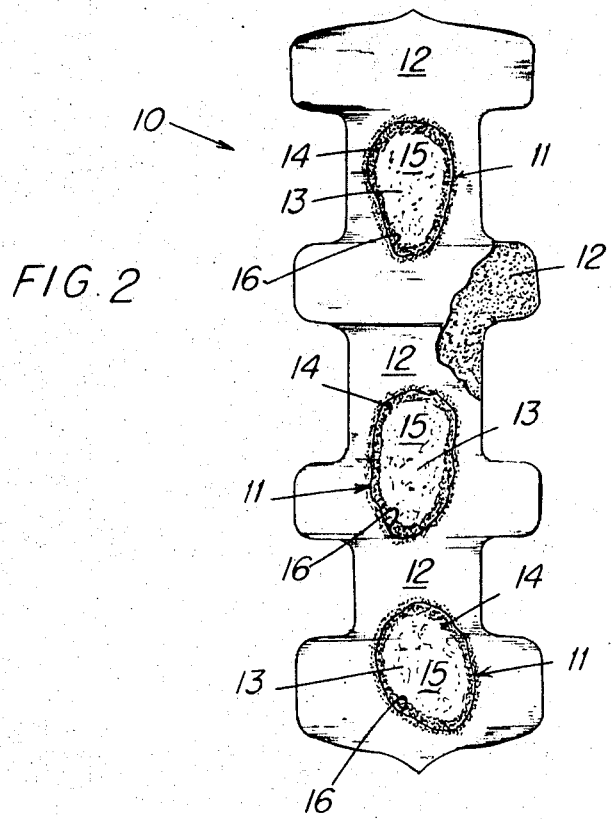

United States Patent Office 3,554,766
Patented Jan. 12, 1971

---

3,554,766
PROCESS FOR MAKING CANDY CONTAINING FREEZE-DRIED FRUIT PARTICLES
Peter H. Engel, Riverside, Conn., and Herbert Knechtel, Park Ridge, Ill., assignors to Philip Morris Incorporated, New York, N.Y., a corporation of Virginia
Filed June 7, 1967, Ser. No. 644,378
Int. Cl. A23g *3/00*
U.S. Cl. 99—134     1 Claim

ABSTRACT OF THE DISCLOSURE

This disclosure relates to an improved fruit product comprising freeze-dried fruit having a preserving and protecting layer comprising sugar and corn syrup, said fruit, under certain circumstances, being partially reconstituted. More particularly, the disclosure relates to fruit-flavored hard candy comprising a hard candy matrix containing particles of freeze-dried fruit, said particles being partially reconstituted and having a preserving and protective layer of sugar and corn syrup. Preferably, the candy also contains natural or synthetic fruit flavoring corresponding to the freeze-dried fruit, whereby a substantially enhanced ultimate flavor results.

The disclosure also relates to a candy product comprising freeze-dried fruit having an inner coating of gum arabic and an outer coating of sugar.

In a preferred embodiment of the invention, a substantial portion of the partially reconstituted freeze-dried fruit is maintained substantially free of any material from the hard candy matrix, whereby the fruit particle is maintained in a desirably brittle condition, retaining its ability to become fully reconstituted during consumption.

The disclosure also relates to an improved process for making a candy product as described above, wherein the fruit particles are added to the syrup at a point after the maximum cooking temperature has been reached in the cooking of the syrup ingredients and are maintained in the mix under specified conditions of time and temperature.

---

The present invention relates to improved fruit products comprising freeze-dried fruit having a preserving and protecting layer of sugar and corn syrup. More particularly the present invention relates to a freeze-dried fruit-containing hard candy of improved flavor, texture, and overall appeal, and to a process for preparing said candy.

Hard candy is usually prepared from a syrup, the starting ingredients of which are sucrose, corn syrup, and water. The syrup may also contain invert sugar. The invert sugar, in combination with the corn syrup, inhibits graining (crystallization) of the sucrose, and serves to regulate the final moisture content of the candy through control of the equilibrium humidity of the final product. Invert sugar can also be provided by adding an acid to the initial ingredients, and cooking the resulting mixture under controlled circumstances whereby inversion occurs to the desired extent.

In the conventional processes for making hard candy, the ingredients of the starting mixture are generally cooked in one or two steps, as a batch or continuous process to form a syrup, then synthetic fruit, imitation flavoring, acidulants, if employed, and certified food coloring are added. The entire mass is then kneaded and cooled for shaping and packaging. However, synthetic flavorants, either alone or in combination with acidulants, have not been found to satisfactorily duplicate the highly desirable flavors of natural fruit, thereby fostering in the consumer a conscious perception of an, often unsatisfactory, imitation flavor.

Attempts have been made to incorporate fresh fruit in hard candy, but such attempts have not been successful, since the fruit was found to deteriorate rapidly with age. Attempts have also been made to incorporate vacuum dried and oven dried fruits in hard candy, but such fruits have poor consistency and flavor.

We have unexpectedly found that freeze-dried fruit, under proper conditions, provides an extremely satisfactory material for incorporation in hard candy.

Referring to the drawing, FIG. 1 represents a sectional view of an enlarged pictorial representation of a piece of freeze-dried fruit which has been treated in accordance with the process of the present invention. In FIG. 1, freeze-dried fruit particle 1, in this instance a freeze-dried blueberry, is shown having a skin 6, a coating 2 comprising a hardened mixture of sucrose and corn syrup, said coating extending into the porous structure 3 of the freeze-dried fruit 1 to form an internal matrix 4 of hardened sucrose and corn syrup. The inner section 5 of freeze-dried fruit 1 is shown free of corn syrup and sucrose. Said inner section 5 may be partially reconstituted or may be substantially unreconstituted. It is preferably not substantially reconstituted. The degree of penetration or depth of the matrix 4 into the freeze-dried fruit 1 will vary according to the desired property of the freeze-dried fruit product but may vary from substantially zero, in which case coating 2 should be substantially continuous to serve as a protective layer for the freeze-dried fruit, or it may penetrate as much as ⅓ of the volume of the freeze-dried fruit to provide a freeze-dried fruit product which will be satisfactory and pleasing to the consumer.

In FIG. 2 of the drawing, a hard candy is shown in representative form, as an illustration of a preferred embodiment of the present invention. Referring more specifically to FIG. 2, a partially cut away view of a piece of hard candy 10 is shown having a waffle configuration and containing pieces of coated freeze-dried strawberries 11, having skin 16, surrounded by a hardened mixture of sucrose and corn syrup which forms the hard candy, a mixture of sucrose and corn syrup extending into the porous structure 13 of the freeze-dried strawberries 11 to form an internal matrix 14 of hardened sucrose and corn syrup. The inner section 15 of freeze-dried strawberries 11 is shown free of corn syrup and sucrose. Said inner section 15 may be partially reconstituted but is preferably substantially unreconstituted. The degree of penetration or depth of the matrix 14 into the freeze-dried fruit 11 will vary according to the desired property of the freeze-dried fruit product but may vary from substantially zero, in which case coating 12 should be substantially continuous to serve as a protective layer for the freeze-dried fruit, or it may penetrate as much as ⅓ of the volume of the freeze-dried fruit to provide a freeze-dried fruit product which will be satisfactory and pleasing to the consumer.

In accordance with a preferred embodiment of the invention, the embedded fruit particles are maintained in a condition whereby they are substantially unpenetrated by the material of the candy matrix, whereby the fruit particles embedded in the candy retain their inherent initial texture and desirably low chewiness, and yet are readily reconstituted.

In another, highly desirable embodiment of the invention the candy also contains one or more natural or synthetic flavorants, essential oils and, optionally, one or more food acidulants, whereby a large number of vastly enhanced flavor varieties can be obtained.

Under the conditions employed in accordance with the present invention, freeze-dried fruit particles which have been prepared, for example, by conventional and well-known freeze-drying techniques retain with moisture considerably more readily than fruit which has been dehydrated by other methods. Since the amount of moisture available upon consumption of candy is limited, as contrasted to situations where freeze-dried fruit is consumed with larger quantities of liquid, such as in the case of a cereal where ample amounts of milk or the like are available for reconstitution, therefore, the maximum outside dimensions of the embedded fruit particle should generally not exceed about ½ inch. On the other hand, the embedded fruit particles should generally not be smaller than about 1/32 inch, so that they are readily visible and so that the consumer can obtain the desirable sensation of consuming a genuine piece of fruit with the candy. The candy will generally contain up to 15% by weight, most suitably between 2% and 15% by weight of fruit particles. Freeze-dried fruit particles which may be employed include, for example, whole berries, such as blueberries, slices of fruit, such as slices of pineapple or of strawberries, and other forms of fruit, such as pieces of apple or slices of lemon rind.

The hard candy is usually prepared from a syrup, which forms a matrix, the starting materials of which syrup are generally sucrose, corn syrup, and water. Some invert sugar may also be present, since such sugar in combination with the corn syrup inhibits graining or crystallization of the sucrose and aids in the regulation of the final moisture content of the candy through the control of the equilibrium humidity of the final product. The starting ingredients for preparing the syrup may include 30–100% by weight, based on the solids content of the starting ingredients, of sucrose, from 0–60% by weight of corn syrup and the product may optionally contain from 0–40% of invert sugar. Sufficient water is added to bring the product into solution. Various materials such as dextrose, lactose, and other sugars, honey, sorbitol, cream of tartar, citric acid and similar acidic materials can be employed to control the degree of crystallization. It is important that the ultimate product, after cooling, contain from 10–20% of reducing sugar on a dry basis, regardless of the method employed for obtaining the same. Thus, the reducing sugar may be initially added, for example, as invert sugar, or may be formed in situ, for example, due to the presence of said acidic materials.

In one embodiment of the process of the present invention, the syrup ingredients, e.g. sugar and corn syrup, are placed in a vessel and are heated to bring the temperature of the ingredients to the level of 270–330° F., preferably 305–315° F., at atmospheric pressure. The heating is conducted for a sufficient period of time to bring the moisture content of the syrup to a level of from about 0% to about 5% by weight and preferably to a level of about 1% or less. Heating of the vessel is then discontinued. While the syrup is in the vessel and immediately before it is poured, freeze-dried fruit particles are introduced into the mixture and intimately admixed therein by suitable means, such as stirrers and the like. The mixture of freeze-dried fruit particles and syrup will generally be retained in the cooking vessel for a period of from about 30 seconds to about 3 minutes. The resulting mixture is then poured on a conventional cold table or belt and is kneaded and passed through suitable forming equipment to form the desired hard candy shape. During the kneading operation, conventional flavorants and colorants are generally added.

As an alternative to this process, the freeze-dried fruit can be incorporated during the kneading operation. However, this operation does not produce a product as uniform as that produced by the preceding process and is less preferred. In either of these processes, it is important that the freeze-dried fruit not be in contact with the hot syrup for a period of more than 5 minutes prior to the start of its cooling on the cold table, cold belt or the like.

In another embodiment of the process of the present invention, the syrup ingredients are heated until the temperature reaches a value of 270–300° F., preferably 280° F. The syrup can then be maintained in the same container or a different container at the same temperature under a vacuum of from 26 to 30″ Hg to bring the moisture content to the desired level of 0–5%, preferably 1% or less. This step is continued for a sufficient period of time to bring the moisture content of the syrup to a level of from about 0% to about 5% by weight and preferably to a level of about 1% or less, and will generally take about 2–3 minutes. Freeze-dried fruit can be incorporated during the last 30 seconds to 5 minutes of the vacuum heating operation and is thoroughly mixed into the syrup at that time. The resulting product is then poured on a cooling table or belt, as described above, and is processed as described above.

As an alternative to this process, the freeze-dried fruit can be incorporated during the kneading operation. However, this operation does not produce a product as uniform as that produced by the preceding process and is less preferred.

In any of the above-described processes, it is important that the freeze-dried fruit should not be in contact with the hot syrup for a period of more than 5 minutes prior to the start of its cooling on the cold table, cold belt or the like. The freeze-dried fruit must not be maintained in the heated syrup for any appreciable period of time, since the degree of reconstitution of the product would be excessive and the ultimate product would not have the desirable qualities which are obtainable in accordance with the present invention.

It is most desirable that the freeze-dried products be such that the freeze-dried fruit particles contained therein have substantially no syrup, i.e. a mixture of corn syrup and sugar, which has penetrated the fruit matrix and hardened therein, or have a layer of syrup which has entered the fruit matrix, as illustrated in the drawing to an extent of no greater than one-third the volume and hardened therein. If the fruit contains no such penetrating layer of syrup, it should be effectively covered by a coating of the solidified syrup, which serves to protect and preserve the freeze-dried fruit.

The flavor of the embedded fruit particle can be supplemented when the flavorant is in the nature of the flavor of the embedded fruit particle, for example blueberry flavoring with blueberries, and strawberry flavoring with strawberries. In this case the flavor of the embedded fruit particle which is released upon full reconstitution during consumption becomes substantially enhanced and accentuated. On the other hand, the flavor of the embedded fruit particle can be complemented when the added flavoring is of different character than the flavor of the embedded particle, for example apricot flavoring with pineapple particles. Such supplementation and complementation can be carried out simultaneously by adding both types of flavorants, whereby yet a different flavoring effect is obtained. Thus a great variety of different and unusual substantial flavor effects can be obtained. These effects can be further varied by the selection and amount of the acidulants.

The proper and skillful choice of the identity and concentration of the freeze-dried food particles, flavorants, acidulants and coloring materials to produce certain desirable physiological and psychological effects requires substantial empirical skill and experience, as well as very well developed acuity of taste, olfaction, and even of the auditory senses. Determinations of this type cannot be made by measurement, and these characteristics cannot be expressed by numbers. While very approximate and gross indications can be obtained by an individual person in a state of high level mental and sensory concentration consuming the candy to be tested, meaningful information can be obtained only through the services of trained taste panels. While human judgment can vary due to psychological and emotional reactions and preferences, persons can be trained and their perceptive powers and their ability of differentiation can be increased with their ganing increasing experience. The system of employing flavor testing panels has been developed to obtain, duplicate, and compare results of a character and detail needed for further research and development, as well as to obtain an indication of the potential acceptance of an alimentary product, short of market testing the product by costly, elaborate procedures which often yield unsatisfactory and inconclusive results. It is generally desirable to use a test panel of as many members as possible, so that outcroppings in the results, brought about by individual judgment or bias can be eliminated by statistical analysis to obtain reasonably reliable averages. In most cases the smell and sound of a food during its consumption is also very important, because these two factors indirectly also contribute to the composite psychological sensation of perceptible taste. As far as the problems of formulating candy compositions and selecting the most desirable process parameters in accordance with the present invention are concerned, it is not only the determination, comparison, rating, etc. of the gustatory, olfactory and auditory attributes of the candy which have to be considered, but also other factors, including tactile sensation in the mouth and chewiness, because these also substantially contribute to appeal. All these and possible additional factors make up the integrated effect which is provided by the hard candy of the present invention. Because of these questions which cannot be always exactly quantitatively delineated, some features of the hard candy of the present invention, such as the exact extent to which candy matrix should be allowed to penetrate the embedded fruit particle, the exact size of the fruit particles employed and the exact amounts of flavorants, colorant, and acidulant combinations and concentrations, as well as certain process parameters during manufacture can be determined best by purpose-directed routine experimentation and taste testing, as is well known in the art, keeping within the limits which are set forth elsewhere in the specification.

If desired, the hard candy of the present invention can also contain certified food coloring to modify the color of both the candy matrix and the embedded fruit particle, according to desire.

The hard candy of the present invention can be of any desired shape. For example, it has been found desirable to provide the candy of the present invention in a substantially flat shape wherein the length or the width of the shaped piece of the candy, or both are a number of times as great as its maximum thickness. Such a shape can also be corrugated, resembling a waffle. By forming the candy of the present invention in such desirable shape, maximum surface of the candy is exposed during consumption and, thereby, one can maximize the impact of the flavor and, at the same time, accommodate the embedded pieces of fruit in a preferably thin and brittle body which allow each breakup of the candy in the mouth.

One or more acidulants, flavorants, and/or food colorings can be added to the syrup in the mixing vessel if one is employed, or directly on the kneading table. These are then incorporated into the syrup mixture by kneading. The acidulants can include tartaric, malic and citric, as well as other like acids, or other known acidulants, usually in quantities of up to about 60 ounces for each 100 pounds of candy product. Most often about 16 ounces of acidulant per 100 pounds of candy product is employed. The desired effect as well as the nature of the particular acidulant or acidulants will determine the actual amount used under any particular circumstance. The amount of any coloring to be added can be determined by visual requirements.

The kneading of the mass is carried out usually within a period of up to 6 minutes. The mass cools during kneading to about 160–230° F., resulting in a substantial increase in its viscosity, but is still malleable at this point. The remaining steps of the process can be carried out in conventional manner, such as spinning or sizing the mass by hand or rolls to stretch it to a diameter approximately that of a finished candy piece, then shaping the rope or ribbon of plastic candy with a forming die or cutter to subdivide it into the shape of the ultimate candy product. The pieces are then generally subjected to cooling, usually to below 90° F. Temperatures considerably below that temperature are often not desirable to avoid the candy picking up excessive amount of moisture. Finally the candy is packaged. If desired, the candy can be provided with a brilliant, opaque surface by incorporating air into the mass by use of a puller.

Alternatively, the candy can be produced by mixing the additives with a liquid syrup and transferring the liquid composition into molds.

The fruit product of the present invention may be prepared by immersing pieces of freeze-dried fruit, such as strawberries, citrus rinds and the like in a syrup solution comprising from about 10 to 90% by weight of sucrose, from about 10 to 90% by weight of corn syrup, from about 0 to 14% by weight of invert sugar and from 0–5% by weight of water. Such a product can be prepared as described earlier for hard candy. However, the preferred syrup for use in treating the freeze-dried fruit comprises: from 70 to 85% sucrose and from 15 to 30% of corn syrup.

The process for contacting the freeze-dried fruit with the above-described syrup may be conducted at 220 to 325° F. and for a sufficient period of time so that the syrup completely coats the fruit and penetrates the pores of the fruit to no more than approximately ⅓% by volume.

Another fruit product of the present invention comprises particles of freeze-dried fruit having an inner coating of gum arabic or the like and an outer coating of sugar. Such a product is completely different from the products described above, but is a unique product which has qualities heretofore unknown. Such a product may be prepared by coating particles of freeze-dried fruit in an aqueous solution of gum arabic, for example in a revolving pan, drying the resulting product and thereafter coating the product with a sugar syrup, such as that described earlier in the specification, but which may also contain from 0 to 25% by weight of gum arabic.

The following examples are illustrative:

EXAMPLE 1

A mixture was prepared using 28 lbs. of granulated sugar, 12 lbs. of corn syrup 43° Baumé High Maltose) sold by Hubinger Co. under the trademark "Silver Sweet," and 7 lb. of substantially neutral water. The mixture was heated, with agitation, in vessel over a gas flame to a temperature of 285° F. After the mixture reached 285° F., 3 lb. 2 oz. of freeze-dried, whole blueberries, having an average particle dimension of about ⅜" diameter, and sold by Freeze-Dried Institute, Evansville, Ind., and artificial coloring were added to the mixture. The fruit and coloring were mixed into the mixture and the temperature of the mixture was again brought to 285° F. The gas flame was then turned off and the resulting mixture was then subjected to a vacuum of 26 inches Hg for a period of slightly less than 5 minutes. The resulting mixture was then poured onto a cooling table and, at this stage, 5 oz. of citric acid crystals, monohydrate and 3.25 fl. oz. of artificial black-currant flavor, sold by W. J. Bush & Co., were introduced into the mixture. The resulting mixture was thoroughly kneaded for about 5 minutes, rolled into a ribbon of about 4" x ½' then fed through a forming machine, yielding hard candy pieces of a "waffle" shape and a size of approximately 15/16" diameter x 3/16" thick. The resultant candy product was estimated to contain 0.9% moisture and about 14% reducing sugars.

A descriptive taste panel found the resulting candy to have desirable brittleness and taste.

EXAMPLE 2

A mixture was prepared using 36 lb. of granulated sugar, 10 lb. of corn syrup (42 D.E., 43° Baumé), 4 lb. of invert sugar (75% invert solids) and 9 lb. of water. This mixture was heated, with agitation, to a temperature of 285° F. in steam jacketed kettle and then subjected to 28.5 inches vacuum for 2 minutes. The cooked syrup was transferred from the vacuum kettle to a cooling table in a portable transfer pan and the following ingredients were then mixed in with the syrup in the pan: 3% of freeze-dried cranberries (supplied by the University of Wisconsin, Department of Agriculture), 1.25% of citric acid monohydrate, 0.37% of cranberry flavor, sold by Seeley Co., and artificial coloring. The resulting batch was then poured onto a cooling table and kneaded for about 5 minutes, rolled into a ribbon of about 4" x ½" then fed through a forming machine yielding hard candy having spherical shapes. The moisture and reducing sugar content of the candy was estimated to be substantially similar to that prepared in Example 1.

A descriptive taste panel found the resulting candy to have desirable brittleness and taste.

EXAMPLE 3

A syrup was prepared by heating to a temperature of 310° F., on a gas fire, the same ingredients in the same amounts as the starting ingredients used in Example 1. The resulting syrup was transferred to a cooling table where 7½%, based on the yield of syrup, of freeze-dried pineapple particles and the same amount of citric acid as in Example 1, plus ½ fl. oz. of apricot flavor, sold by Dragoco under their designation N-912, were added and mixed in.

Subsequent processing was carried out as described in Example 1.

A descriptive taste panel found the resulting candy to have desirable brittleness and taste.

EXAMPLE 4

The process of Example 3 was repeated with the exception that the freeze-dried fruit particles were added in this case to the cooking pot (and stirred into the syrup) after cooking was completed and immediately before pouring the syrup onto the kneading table. The texture of the resulting product was a little more chewy than the candy made in accordance with Example 3 due to a greater penetration of the syrup into the fruit particles and a resultant destruction of the desirable brittleness of the fruit particle in the candy.

A descriptive taste panel found the resulting candy to have desirable brittleness and taste.

EXAMPLE 5

The same initial syrup ingredients in the same amounts as in Example 1 were placed into a heating pot. The same kind of freeze-dried blueberries as used in Example 1 were added to the room temperature batch which was then heated to a temperature of 310° F. and poured onto a kneading table. Five oz. of citric acid monohydrate and ¾ fl. oz. of the artificial black-currant flavor used in Example 1, were also added. The batch was kneaded, and then finished into a hard candy product as in Example 1.

It was estimated that the finished candy contained an excessive amount of invert sugars due to the presence of acid which leaked out from the fruit particles in the prolonged contact of the particles with the syrup during preheating and cooking. Both the flavor and the color of the blueberries leached out into the candy matrix, adversely affecting flavor and color of the candy. A testing panel found that the embedded fruit particles could not be desirably reconstituted because they were excessively hard and decidedly chewy.

EXAMPLE 6

Freeze-dried cranberries, supplied by the University of Wisconsin, were put into a revolving pan and coated with a solution of 50 parts of weight of gum arabic and 50 parts by weight of water. The resulting coated fruit particles were then dried by being coated with powder sugar.

The coated fruit was removed from the pan and spread in trays for drying purposes and left overnight. The next day, the fruit was put back into the pan and a coating of syrup was applied. The syrup consisted of:

| | Lbs. |
|---|---|
| Corn syrup | 2 |
| Sugar | 1 |
| Gum arabic solution (50–50) | 1 |

The fruit was again removed from the pan and dried overnight. The next day, a straight sugar/water syrup was applied with color. When dry, the coated particles were removed and placed in a ribbed pan and polished with carnauba wax. The resulting coated fruit was found to be tougher and chewier than the products of Examples 1–5.

EXAMPLE 7

The following ingredients were employed in this run:

850 gms. of white sugar.
185 gms. of corn syrup.
26.1 gms. freeze-dried strawberries.
230 mls. of water.

The cooked sugar, corn syrup and water were mixed and heated to a temperature of 315° F. Freeze-dried strawberries were dipped in the resulting hard candy with a fork and placed in a tray to cool. The resulting product had a finished weight of 171.2 gms. of which 26.1 grams were freeze-dried strawberries. Upon examination of the product, it was found that little or no hydration of the fruit took place, with the result that a desirable crisp textured fruit was attained. The hard candy coating was found to be thin enough to bite through with ease, resulting in a pleasant crispness throughout the pieces.

We claim:
1. A process for preparing candy comprising the steps of heating a mixture consisting of from about 30 to about 100% by weight of sugar, from about 0 to about 60% by weight of corn syrup and from about 0 to about 40% by weight of invert sugar and water sufficient to dissolve the same at a temperature of about 270–300° F. for a period of from about 30 seconds to about 3 minutes to bring the moisture content of the resulting mixture to the level of from about 0 to 5% by weight, the mixture finally containing from 10–20% reducing sugar, adding from 2–15% by weight of freeze-dried fruit particles of from about 1/32 to ½ inch in size to said mixture and stirring or otherwise mixing said mixture to disperse said freeze-dried particles throughout said mixture, said stirring or mixing operation taking place for a period of time from about 30 seconds to about 3 minutes, pouring the resulting mixture on a relatively cold surface and thereafter kneading and forming said mixture as it hardens to produce hard candies containing freeze-dried fruit particles, said freeze-dried fruit particles being penetrated by said mixture to a degree no greater than 33⅓ volume per- cent and said freeze-dried fruit particles having a coating over substantially their entire outer surface.

References Cited

UNITED STATES PATENTS

| | | | |
|---|---|---|---|
| 2,855,315 | 10/1958 | Rerrozzi et al. | 99—204 |
| 3,271,256 | 9/1966 | Frey | 167—82 |
| 3,419,402 | 12/1968 | Laskin | 99—199 |
| 3,295,992 | 1/1967 | Frey | 99—134 |
| 3,472,663 | 10/1969 | Laskin | 99—199 |
| 3,483,000 | 12/1969 | Laskin | 99—134 |

OTHER REFERENCES

Skuse's Complete Confectioner, W. J. Bush & Co., Ltd., London, England, 1957, pp. 170–171.

LIONEL M. SHAPIRO, Primary Examiner

U.S. Cl. X.R.

99—204